United States Patent
Murakami

[19]

[11] Patent Number: 5,983,293
[45] Date of Patent: Nov. 9, 1999

[54] FILE SYSTEM FOR DIVIDING BUFFER AREAS INTO DIFFERENT BLOCK SIZES FOR SYSTEM AND USER DATA

[75] Inventor: Takeo Murakami, Kawasaki, Japan

[73] Assignee: Fujitsu Limited, Kawasaki, Japan

[21] Appl. No.: 09/019,042

[22] Filed: Feb. 5, 1998

Related U.S. Application Data

[63] Continuation of application No. 08/296,247, Aug. 25, 1994, abandoned.

[30] Foreign Application Priority Data

Dec. 17, 1993 [JP] Japan .................................. 5-317832

[51] Int. Cl.[6] ................................................. G06F 13/38
[52] U.S. Cl. ............................. 710/56; 710/3; 710/25; 707/205; 709/212; 711/119; 711/129
[58] Field of Search ............................. 395/200.42, 823, 395/845; 711/119, 129; 710/3, 25, 56; 707/205; 709/212

[56] References Cited

U.S. PATENT DOCUMENTS

| | | | |
|---|---|---|---|
| 3,924,245 | 12/1975 | Eaton et al. ............................. | 395/421 |
| 4,315,312 | 2/1982 | Schmidt ................................. | 395/497 |
| 4,920,531 | 4/1990 | Isono et al. ............................. | 370/60 |
| 4,933,835 | 6/1990 | Sachs et al. ............................. | 364/200 |
| 4,965,717 | 10/1990 | Cutts, Jr. et al. ...................... | 395/182.1 |
| 4,989,134 | 1/1991 | Shaw ....................................... | 364/200 |
| 5,077,658 | 12/1991 | Bendert et al. ......................... | 424/501 |
| 5,088,031 | 2/1992 | Takasaki et al. ....................... | 395/400 |
| 5,095,424 | 3/1992 | Woffinden et al. .................... | 395/425 |
| 5,237,661 | 8/1993 | Kawamura et al. .................... | 395/250 |
| 5,237,682 | 8/1993 | Bendert et al. ......................... | 395/600 |
| 5,247,616 | 9/1993 | Berggren ............................ | 395/200.42 |
| 5,276,823 | 1/1994 | Cutts, Jr. et al. .................. | 395/182.09 |
| 5,375,233 | 12/1994 | Kimber et al. ......................... | 707/205 |
| 5,381,528 | 1/1995 | Brunelle ................................. | 395/250 |
| 5,437,028 | 7/1995 | Iijima et al. ........................... | 395/600 |
| 5,493,668 | 2/1996 | Elko et al. ............................. | 395/457 |
| 5,553,307 | 9/1996 | Fujii et al. ............................. | 395/845 |
| 5,577,226 | 11/1996 | Percival ................................. | 711/119 |
| 5,581,736 | 12/1996 | Smith ................................ | 395/497.01 |
| 5,619,723 | 4/1997 | Jones et al. ............................ | 395/823 |
| 5,680,573 | 10/1997 | Rubin et al. ............................ | 711/129 |

*Primary Examiner*—Thomas C. Lee
*Assistant Examiner*—Harold Kim
*Attorney, Agent, or Firm*—Staas & Halsey, LLP

[57] ABSTRACT

A file system in a computer for managing buffer areas. A buffer area includes file input and output data and is divided into a plurality of areas for each application object such as system data and user data. Each divided buffer area is independently managed by a buffer management processing unit for controlling the acquisition and release of buffers requested. A circuit for designating a block size and a lower limit value of an assignable block is provided for each buffer area divided according to an application object to realize effective use of buffer areas and a reduction in the waiting time for the acquisition of buffers.

6 Claims, 10 Drawing Sheets

B11~B24:

| PARTITION NUMBER | BLOCK SIZE | LOWER LIMIT VALUE OF ASSIGNABLE BLOCK |
|---|---|---|
| 1 | S1 | L1 |
| 2 | S2 | L2 |
| 3 | S3 | L3 |

FILE SYSTEM FOR DIVIDING BUFFER AREAS INTO DIFFERENT BLOCK SIZES FOR SYSTEM AND USER DATA

RELATED APPLICATION

This application is a continuation of U.S. patent application Ser. No. 08/296,247, filed Aug. 25, 1994, abandoned.

BACKGROUND OF THE INVENTION

1. Field of the Invention

The present invention relates to a file system which manages buffers considering the input and output of system data such as a swap. Input and output performance of the system is improved through buffer management of each application object of each input and output of data in the file system.

2. Description of the Related Art

The increase of data handled by large scale numerical computations and processing of moving pictures has greatly increased in the past few years. The programs for handling the computations and processing are complicated and require a larger capacity storage device. Therefore, a computer system is now required to realize high speed processing of an extremely large amount of data. Meanwhile, new developments including high performance CPUs and the maturity of parallel processing techniques, etc., have brought about extraordinary improvements in the processing power of computers. Moreover, realization of extremely large capacity has also reached the secondary storage device and the main storage device of the computer. However, improvement in data transfer speed of the secondary storage device is rather small and is now considered a bottle-neck in the system.

The main storage device is usually utilized as a buffer of the secondary storage device to realize high speed input and output processings. However, since the capacity of the main storage device is limited, it is a must that effective management is performed on the limited buffer area.

In prior art systems, management of buffers has been carried out after the total buffer area has been divided into fixed length blocks. The buffer area allows coexistence of a swap file, a file used by the system such as dump, etc., and a file used by users such as a load module and data file, etc. Therefore, when a swap has been carried out and the dump has been acquired, the buffer area is totally occupied by the system. This generates a problem that a program cannot obtain a sufficient buffer area and input and output performance is deteriorated.

Moreover, when the swap is activated while a job is running by inputting and outputting a large amount of data totally occupying the buffer area, the system cannot reserve sufficient buffer area, resulting in a problem that swap processing generates a delay.

As described previously, prior art which employs conventional buffer management systems has a problem in that any data selected will occupy almost all the buffer area because the buffer area is competitively used for system data and user data. Thus, input and output performance is extremely lessened.

SUMMARY OF THE INVENTION

It is an object of the present invention to improve the input and output performance of a computer system by dividing the buffer area into respective application areas and managing the buffer considering input and output characteristics of the application areas.

According to one object of the present invention, the buffer area 18 for file input and output is divided, for example, depending on an application object as shown in FIG. 1. Each of the divided areas is called a partition. One partition is a buffer area 18S for system data to be used by the system such as a swap file or dump, etc., reserved during swap-out of the job (process). Another partition is a buffer area 18U for user data to be used by a user program. A buffer management processing circuit 14 carries out independent management on the respective buffer areas to control acquisition and release of the requested buffer. Moreover, it is also possible to further divide the buffer area 18S for system data or the buffer area 18U for user data for additional application objects.

According to another object of the present invention, a block size designating circuit 12 designates a block size as a buffer management unit for each divided buffer area (partition) depending on the application object when the buffer is set when the system is activated. With different block sizes, the buffer management processing circuit 14 manages the buffer area 18S for system data and the buffer area 18U for user data depending on the designated block size to control acquisition or release of the buffer.

According to yet another object of the present invention, the buffer management processing circuit 14 manages the number of blocks to be assigned for each partition. The blocks assignable are those which are not yet used and do not store any effective data or those which have already stored effective data matching the contents on a disk. The blocks which have stored effective data therein but do not reflect the contents thereof on the disk are not assignable. These blocks are referred to as dirty blocks.

The buffer management processing circuit 14 checks, at the time of block assignment, whether the number of assignable blocks is less than a predetermined constant value (a lower limit value of the assignable blocks). When the number of assignable blocks is less than the predetermined constant value, contents of the dirty blocks in the list are returned through a writing process to a secondary storage device 20, such as a disk or the like. Thus, the number of assignable blocks can be increased.

According to still another object of the present invention, a lower limit value designating circuit 13 designates, the lower limit value of the assignable blocks for each buffer area (partition) divided for respective application objects when buffers are set when the system is activated. Therefore, the buffer management processing circuit 14 acquires a number of assignable blocks larger than the predetermined constant value with reference to the designated lower limit value of the assignable blocks.

According to a further object of the present invention, the content of a job or process under execution which may be swapped out is written into a swap file. During this time, when a sufficient buffer area is reserved for the swap file, data is written into the buffer and a dirty flag is then set, which indicates that nothing is written into the buffer block for the secondary storage device 20. The block to which a dirty flag is set is no longer assignable even after it is released, but it can become an assignable block, whenever it is required, through writing back to the secondary storage device 20. Thereafter, when swap-in of a job is carried out and the swap file is read again, control is then carried out to turn off the dirty flag of the relevant buffer block.

DESCRIPTION OF THE PREFERRED EMBODIMENT

According to an embodiment of the present invention, even if a worst case occurs where data input/output for a system is executed in parallel with data input/output for a user, both buffer areas 18S and 18U are ensured of reserving a constant capacity buffer area because the buffer areas are divided. Accordingly, input/output of data having stabilized velocity is realized by utilizing the buffer areas 18S and 18U for system data and user data, respectively.

Since the system data and the user data are quite different from each other in their input/output properties and data size, the optimum buffer management unit for buffer application efficiency and the input/output characteristics are also different. A block size can be designated for each partition. The optimum block size can be respectively set considering data of each partition and the input/output characteristics of each partition of system data and user data.

In prior art systems, if a new buffer acquisition request appears when assignable blocks no longer exist in the buffer, assignment must be done after writing back the dirty block to the disk. This increases waiting time for acquisition of the buffer. According to the present invention, the waiting time for acquisition of a buffer is not required and the input/output characteristics of the system data and user data are improved. This is because a number of assignable blocks larger than the predetermined constant value are always reserved.

Moreover, since the input/output size and the access pattern of the data are different depending on the application object, the optimum lower limit value of the assignable blocks is different for each partition. According to the present invention, since different lower limit values of the assignable blocks can be set for each partition, the input/output characteristics can be improved by respectively setting the values suitable for the application of each partition.

When the swap file is once read during the swap-in operation during swap control of the job or process under execution, it is never read again. Therefore, if a dirty block is left in the buffer when the swap-in occurs, it is unnecessary to write back the contents of the dirty block to the secondary storage device 20 such as the disk or the like because the dirty flag is turned off during the swap-in mode. Useless writing back to the disk is prevented and the input/output characteristics of the system data and user data are improved. Moreover, since the buffer has room because of the partitions, high speed swap control is possible because swap-out and swap-in can be realized only in the buffer without accessing the secondary storage device 20.

Figure 1:
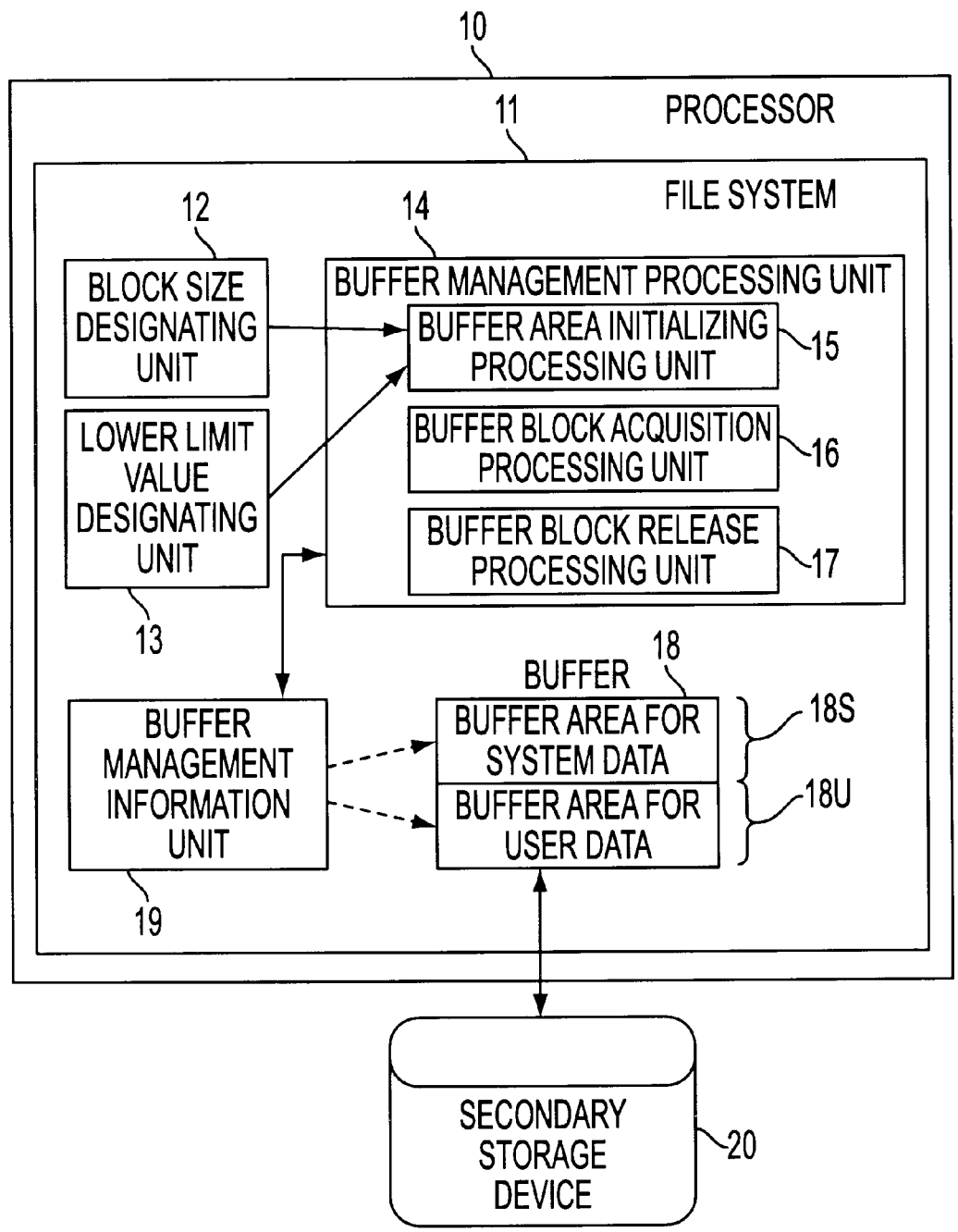
FIG. 1 is a block diagram of an embodiment according to the present invention.

FIG. 1 is an example of a structure according to the present invention. In FIG. 1, the numeral 10 designates a processing unit including a central processing unit (CPU) and a main storage device (memory), etc. Numeral 11 designates a file system for inputting and outputting a file. Numeral 12 designates a block size designating unit for designating a block size of a buffer for each partition. Numeral 13 designates a lower limit value designating unit for designating the lower limit value of the assignable block existing within the buffer area for each partition. Numeral 14 designates a buffer management processing unit including a buffer area initialization unit 15, a buffer block acquisition unit 16 and a buffer block releasing unit 17. Numeral 18 designates a buffer area dividing unit which divides the buffer area into partitions 18S for system data and 18U for user data. Numeral 19 designates buffer management information unit for maintaining management information of the buffer area 18 and numeral 20 designates a secondary storage device such as a disk apparatus.

The buffer area initialization unit 15 initializes, as the processing unit, the buffer area 18 depending on the parameter designated for each partition by the block size designating unit 12 and lower limit value designating unit 13 and sends the partition management information to the buffer management information unit 19. The buffer block acquisition unit 16 acquires, as the processing unit, a buffer block from a relevant partition for the buffer acquisition request from the request issuing area where the buffers are used. The buffer block release processing unit 17 releases the relevant block, as the processing unit, for the acquired buffer release request.

As shown in FIG. 1, the buffer area 18 for file input/output is initialized by the buffer area initializing processing unit 15. The buffer area 18 allows division, at the time of initialization, into areas in a plurality of application objects such as the buffer area 18S for system data and the buffer area 18U for user data. The buffer management processing unit 14 independently manages respective buffer areas and controls acquisition and release of buffers requested by the buffer block acquisition processing unit 16 and the buffer block release processing unit 17.

Figure 2:
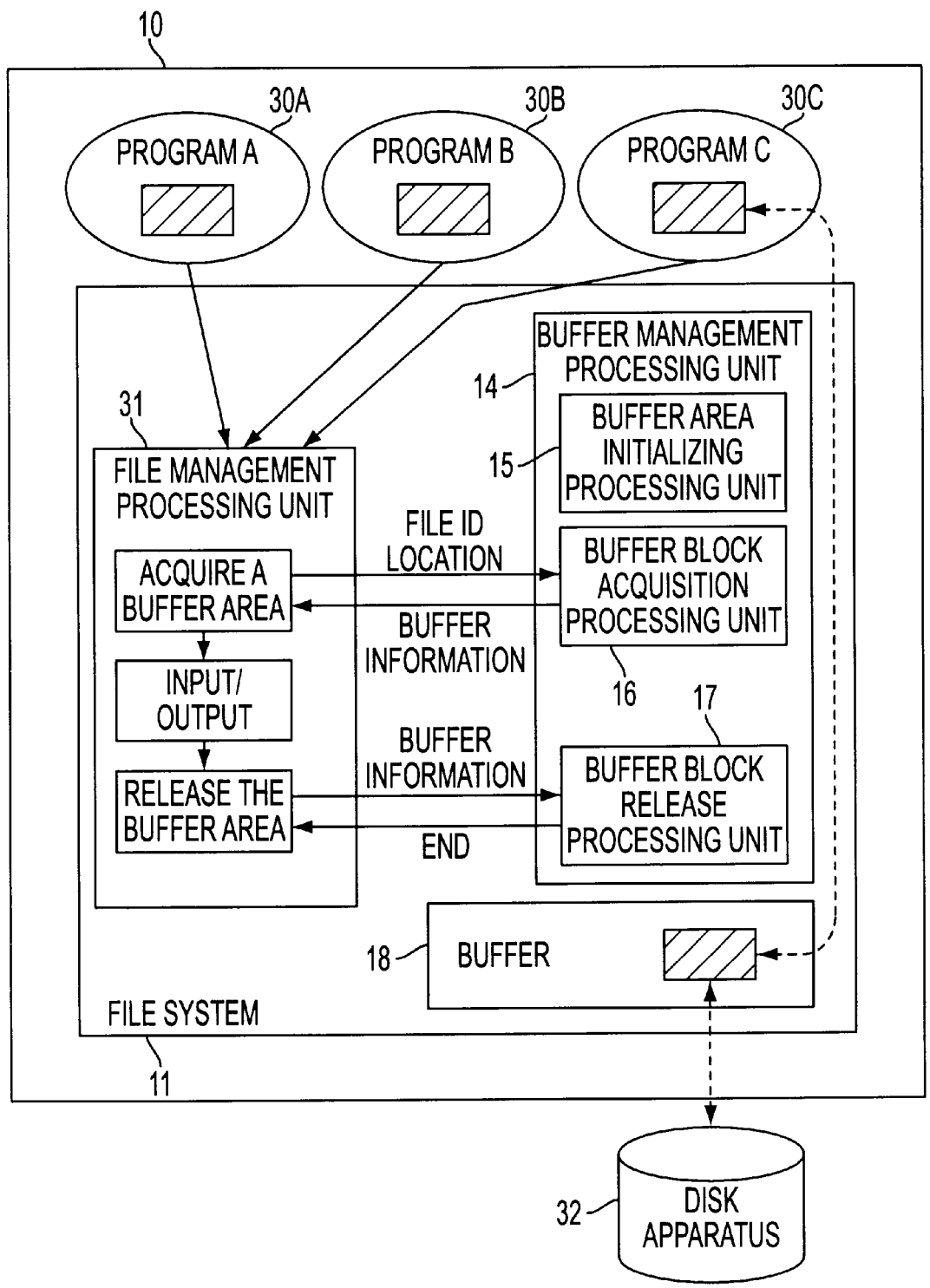
FIG. 2 is a block diagram of the file system according to the present invention.

FIG. 2 is a diagram for explaining a file system according to the present invention. In FIG. 2, the elements designated by like reference numerals in FIG. 1 correspond to those shown in FIG. 1. Reference numerals 30A–30C are programs A–C such as application programs for input to and output from a file. Reference numeral 31 is a file management processing unit for receiving and processing input/output requests to and from files. Reference numeral 32 is a disk apparatus in which files are stored.

A file system 11 is formed by the file management processing unit 31, buffer management processing unit 14 and buffer areas 18 for file input/output. The file management processing unit 31 is a processing module which receives input/output requests from an application program and executes data input/output processings between an intrinsic data area of a program, a buffer of the file system 11 and the disk apparatus 32.

The buffer management processing unit 14 is a processing module which manages the buffer area 18 used in the file system 11 and executes buffer acquisition and release processings in block units responding to a request from the file management processing unit 31. The buffer management processing unit 14 is separated into the buffer area initializing processing unit 15, the buffer block acquisition processing unit 16 and the buffer block release processing unit 17 as also shown in FIG. 1.

Figures 3A, 3B:
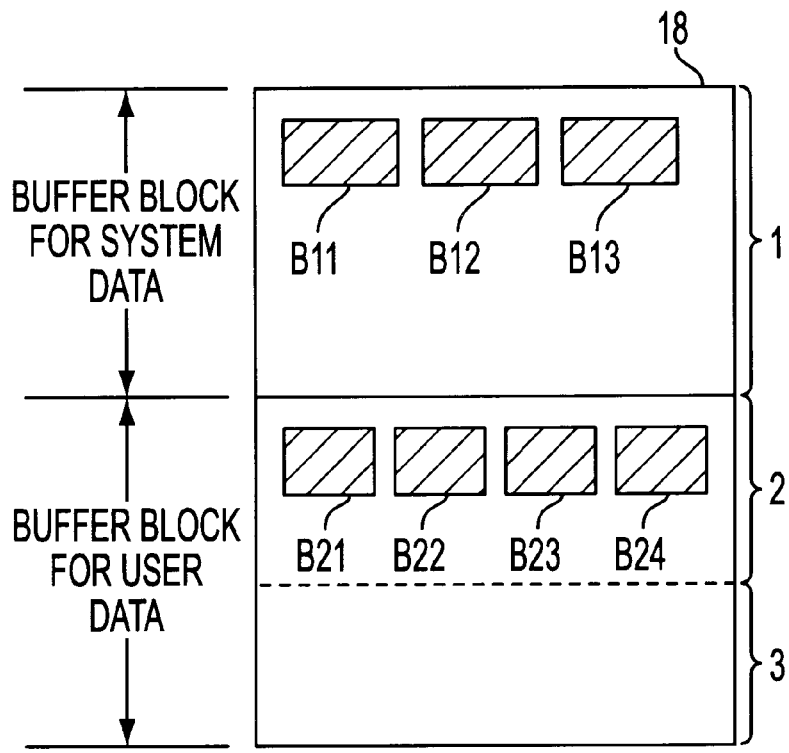
FIGS. 3A and 3B are diagrams showing a division of a buffer area according to the present invention.

The buffer area 18 is divided for management purposes into areas corresponding to the application objects as shown in FIG. 3A. In this example, the buffer area 18 is divided into three partitions so that the partition 1 is assigned as the buffer area for system data and the partitions 2 and 3 are assigned as the buffer area for user data.

The block which is considered as a unit for acquisition and release management in each partition can be previously designated with respect to size for each partition. In the case of system data, a large amount of data are generally input or output like the swap and dump, etc. Therefore, in this example, a larger block size is set as the size of the buffer blocks B11–B13 in the partition 1 for system data. Meanwhile, since a small unit of data is generally input or output in the partition 2 for user data, a smaller size is set for the buffer blocks B21–B24.

For each partition, the lower limit value of the assignable blocks can be previously designated at the time of initialization. These pieces of information are managed, as shown in FIG. 3B, as the partition management information for each partition. This partition management information is stored in the buffer management information unit 19 shown in FIG. 1.

Figure 4A:
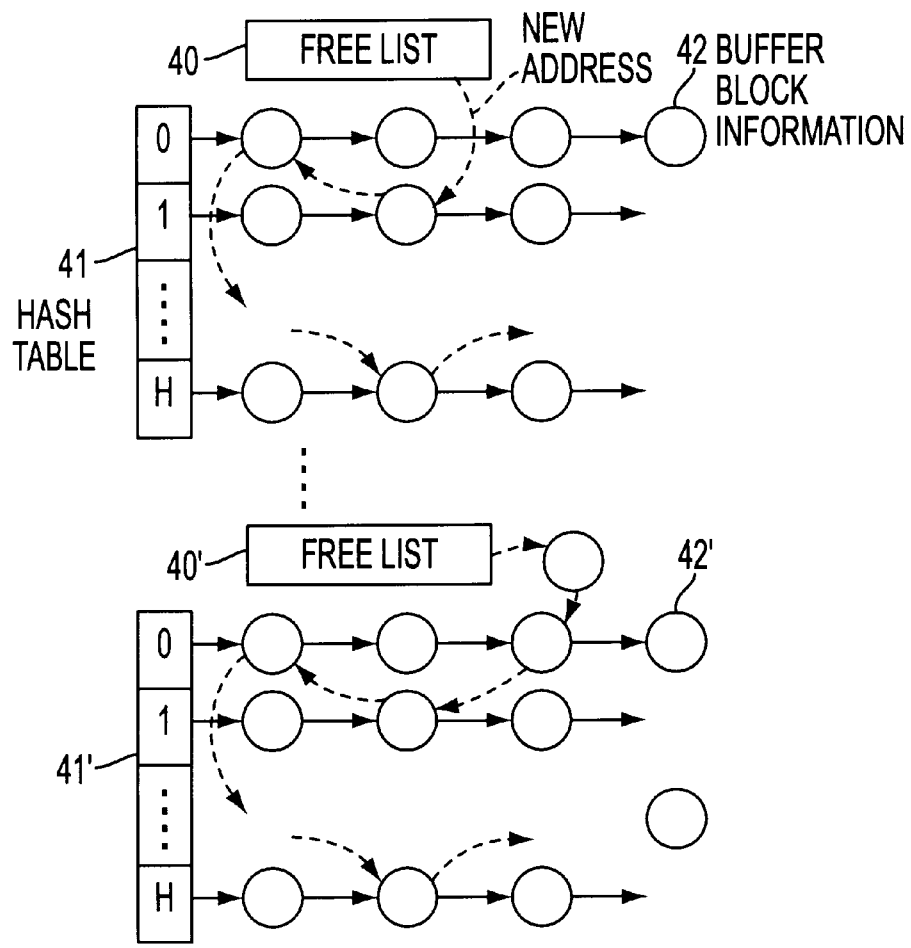
FIGS. 4A and 4B are diagrams of a buffer block and its management according to the present invention.

FIG. 4A is a diagram for explaining buffer block management information according to the present invention. In addition to the partition management information, a hash queue and a free list are held in a block unit for each partition as the data structure for managing the buffer area 18. In FIG. 4A, the reference numeral 40 designates a free list for managing a block which can be converted to an assignable block by writing back to the disk. Reference numeral 41 is a hash table for managing hash queues. Reference numeral 42 designates buffer block information which is management information corresponding to each block.

For the management of hash blocks, the hash table 41 has queue pointers corresponding to hash values 0-H provided for each partition as shown, for example, in FIG. 4A and the buffer block information 42 includes effective data for each hash value in the form of a list. The hash value is computed considering a file ID and an intra-file position as keys in this example to input a new hash value. The file ID is file identification information which is uniquely given in the system. The intra-file position is offset (displacement) information from the beginning of the relevant file.

The free list 40 holds, in the form of a list, the buffer block information 42 which is considered as an object of snatching at the time of assignment of the new buffer block. Snatching refers to obtaining a new buffer area. The free list 40 controls the snatching.

Figure 4B:
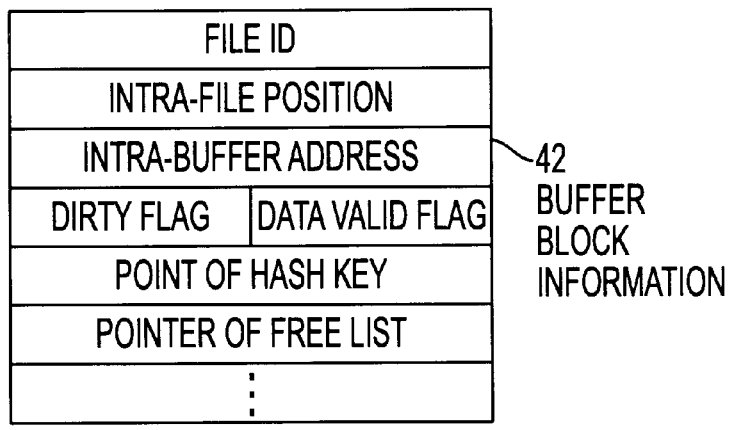

The buffer block information 42 corresponds to individual buffer blocks and has a file ID corresponding to the content of the block and information about intra-file position, and a field of an intra-buffer address of such block (for example, offset from the beginning of the partition or block number, etc.), as shown, for example, in FIG. 4B. The above information also includes a dirty flag indicating that contents of the block are not yet written on the disk apparatus 32, and a data effective flag indicating that the contents of the block are effective. In addition, the above information also has pointers for chaining hash queues and pointers for chaining the free list.

Figure 5A:
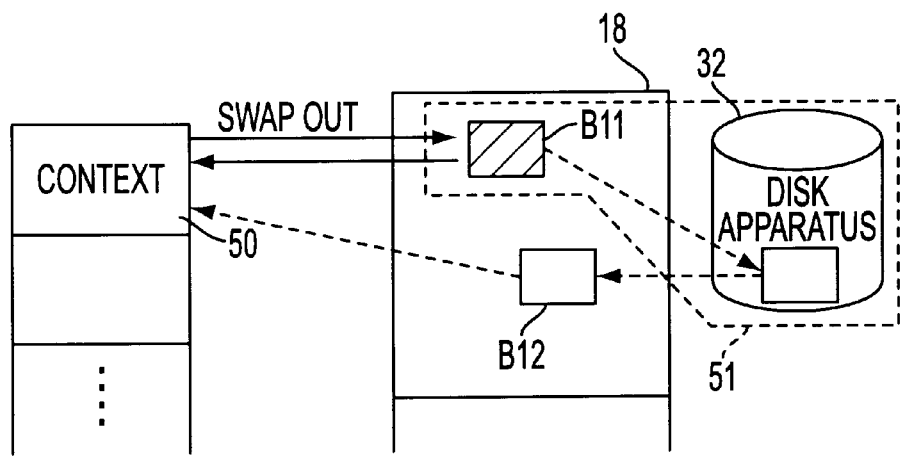
FIGS. 5A, 5B and 5C are diagrams explaining swap control according to the present invention.
Figure 5B:
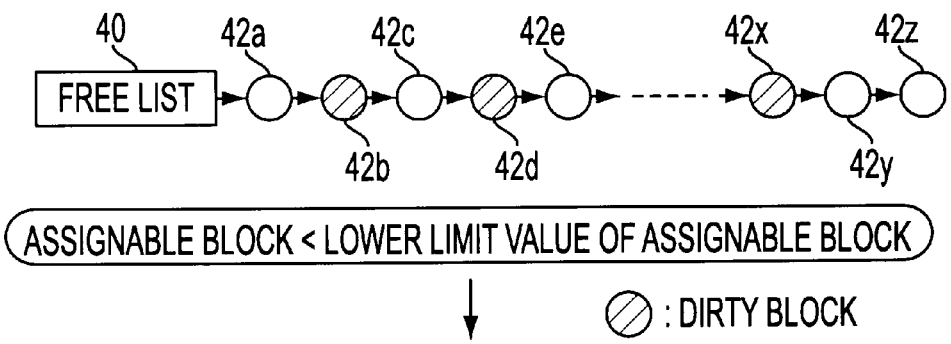
Figure 5C:
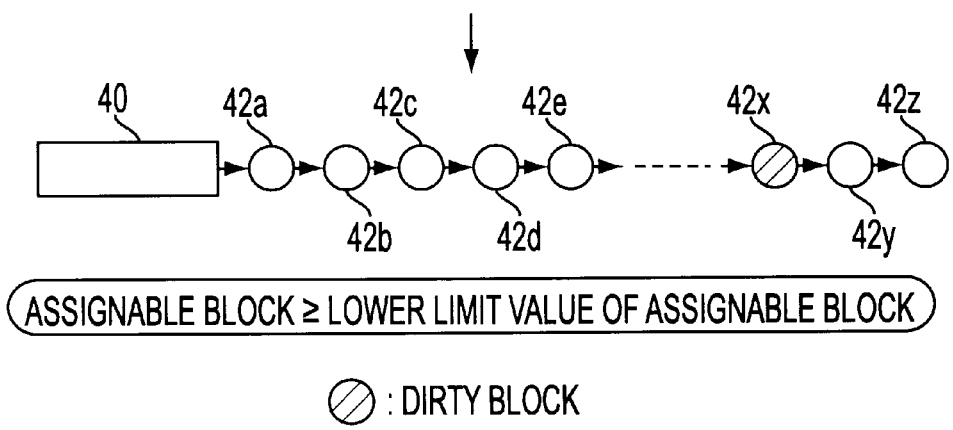

Next, the swap control utilizing the buffer management system based on the present invention will be explained. FIGS. 5A–5C are diagrams for explaining swap control in the present invention.

The swap processing is carried out for preparing a memory area which has been used heretofore for other jobs by saving the memory area which is currently used by a job to another area. In this embodiment, a context (a program to perform a specific job) 50 of a job is swapped out to the block B11 acquired in the buffer area 18 and the dirty flag of the block B11 is turned on as shown in FIG. 5A. The buffer block information 42 of the block B11 is coupled with the free list 40. In the case of a swap-in-mode, the block B11 is acquired corresponding to the buffer block acquisition request and the content of the block B11 is recovered as the context 50 of the job. When the swap-in mode occurs, the dirty flag of the relevant block B11 is turned OFF.

The content of the block B11 during the swap is written back to the disk apparatus 32 and processed as the assignable block when the number of assignable blocks of the buffer area 18 becomes less than the predetermined lower limit value. During the swap-in mode, if the data of the block B11 is invalid, the new block B12 is acquired, the swapped context 50 is read from the disk apparatus 32 and the context 50 is recovered in the new job area from the block B12.

In view of the above processings, the swap file 51 can be realized by the buffer area 18 and the area on the disk apparatus 32. As noted above, when the swap-in mode occurs, the dirty flag is turned OFF. Therefore, useless writing back to the disk apparatus 32 is prevented. That is, when the buffer area 18 has sufficient area, access to the disk apparatus 32 is not necessary during the swap-out-swap-in mode.

A block in which the dirty flag is turned on is called a dirty block. The dirty block does not reflect the contents thereof on the disk apparatus 32. In the free list 40 shown in FIG. 5B, the blocks having hash marks including the buffer block information 42b, 42d, . . . , 42x are the dirty blocks. The other blocks are assignable blocks. When the number of assignable blocks becomes smaller than the lower limit value of the assignable blocks preset for each partition, data writing is carried out to the disk apparatus 32 for the dirty blocks, turning off the dirty flag. Thereby, as shown in FIG. 5C, the number of assignable blocks is controlled so that they become larger than the lower limit value of the assignable blocks.

Figure 6A:
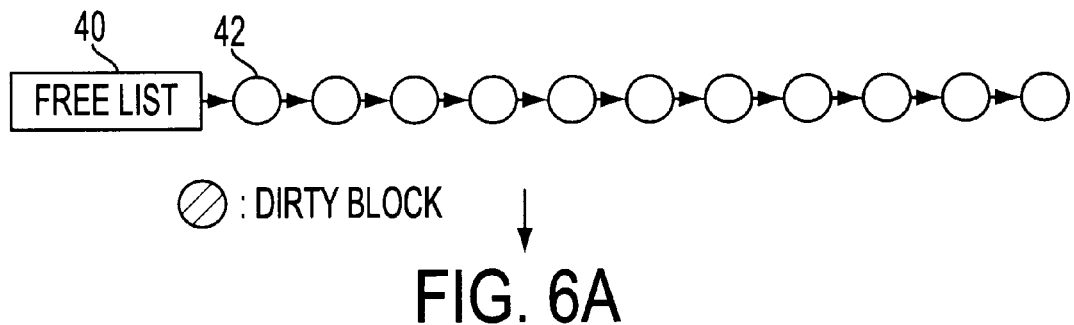
FIGS. 6A, 6B and 6C are diagrams illustrating a transition of a block condition during a swap according to the present invention.
Figure 6B:
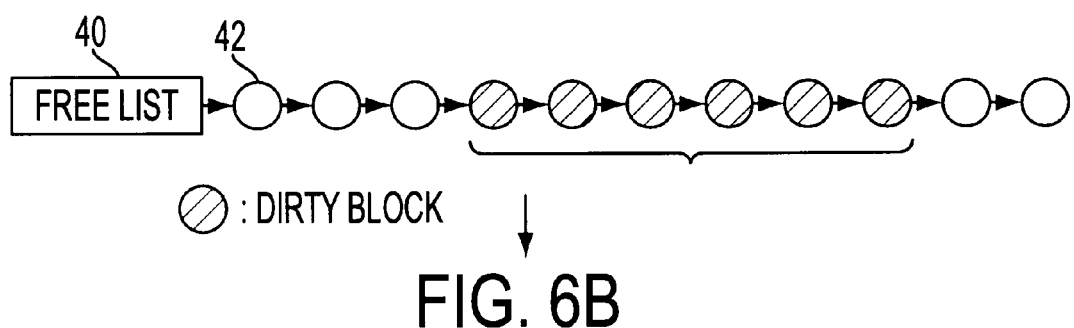
Figure 6C:
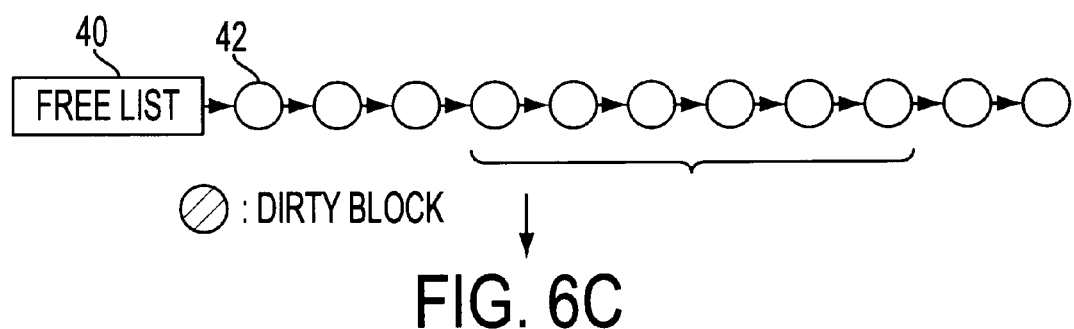

FIG. 6 is a diagram illustrating the transition state of the blocks during a swap according to the present invention. Under the conditions shown in FIG. 6A, when the buffer block is acquired for swap-out, the necessary number of blocks for the swap file is reserved and are released after the swap-out by turning OFF the dirty flag. The condition of the buffer block information 42 coupled with the free list 40 is as shown in FIG. 68. When the swap-in is carried out, the dirty flag of the block used as the swap file is turned OFF, and the transition is as shown in FIG. 6C.

Figure 7:
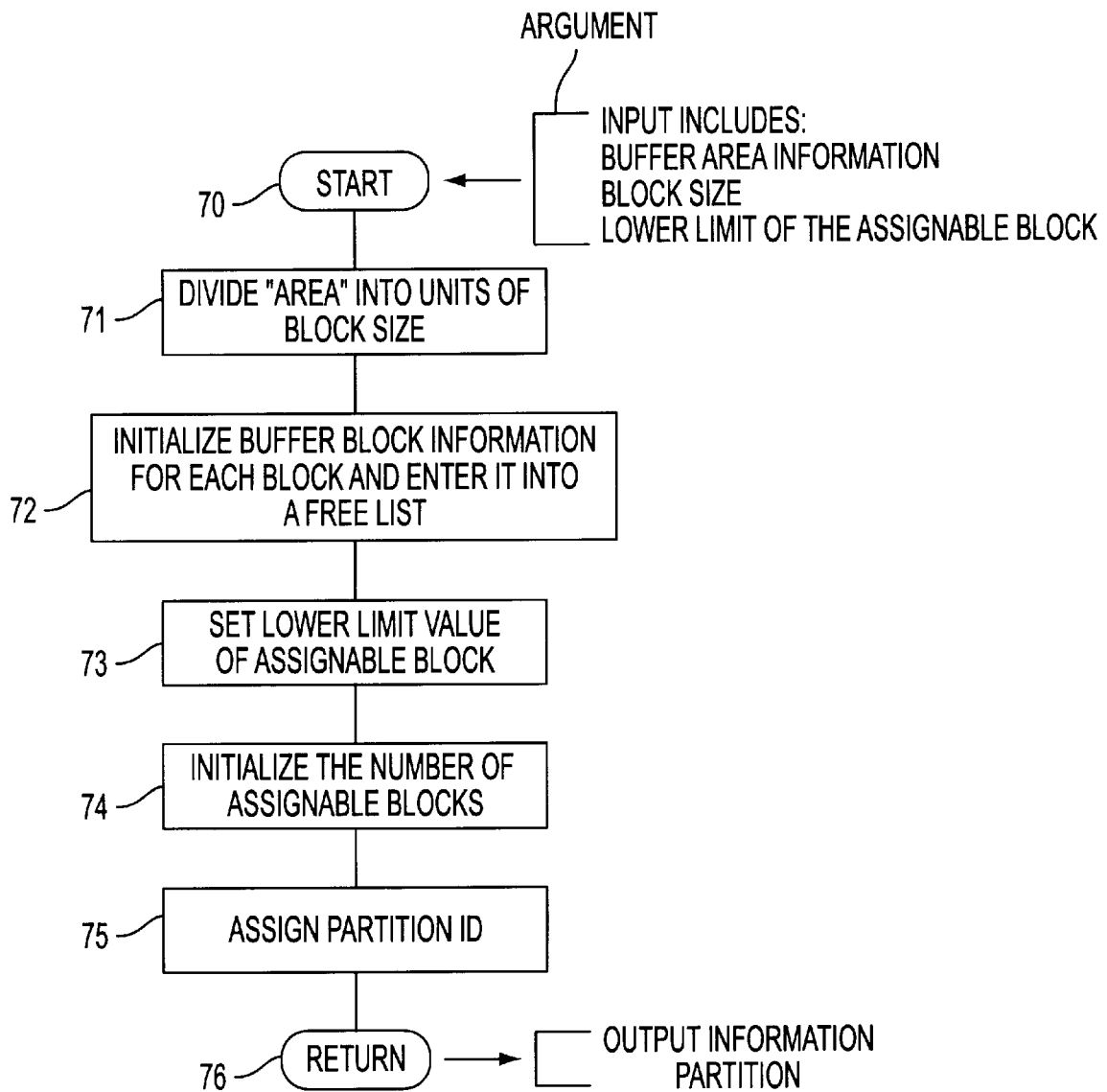
FIG. 7 is a flowchart of buffer area initialization process according to the present invention.

FIG. 7 is a flowchart explaining the buffer area initialization process of the present invention. The buffer area initialization process unit 15 shown in FIG. 2 is called from the file management processing unit 31 at the time of system initialization. An input parameter of arguments includes the buffer area information, the block size and the lower limit value of the assignable block (step 70 in FIG. 7). The buffer area initialization process unit 15 first divides the object area into units of the designated block size in step 71. Next, in step 72, the buffer block information 42 having the content shown in FIG. 4B is initialized for each block and is then stored in the free list 40. In step 73, the lower limit value of the designated assignable block is set as the partition management information. In step 74, the total number of blocks is initialized as the number of assignable blocks. In step 75, the partition ID is called and is then assigned to a buffer area (system or user area). The partition ID is then returned to the file management processing unit 31 in step 76.

The file management processing unit 31, as shown in FIG. 2, divides the buffer area 18 used by the file system 11 into a plurality of areas based on partitions set for each application object by calling the buffer area initialization process unit 15 for each application object of the buffer area.

Figure 8:
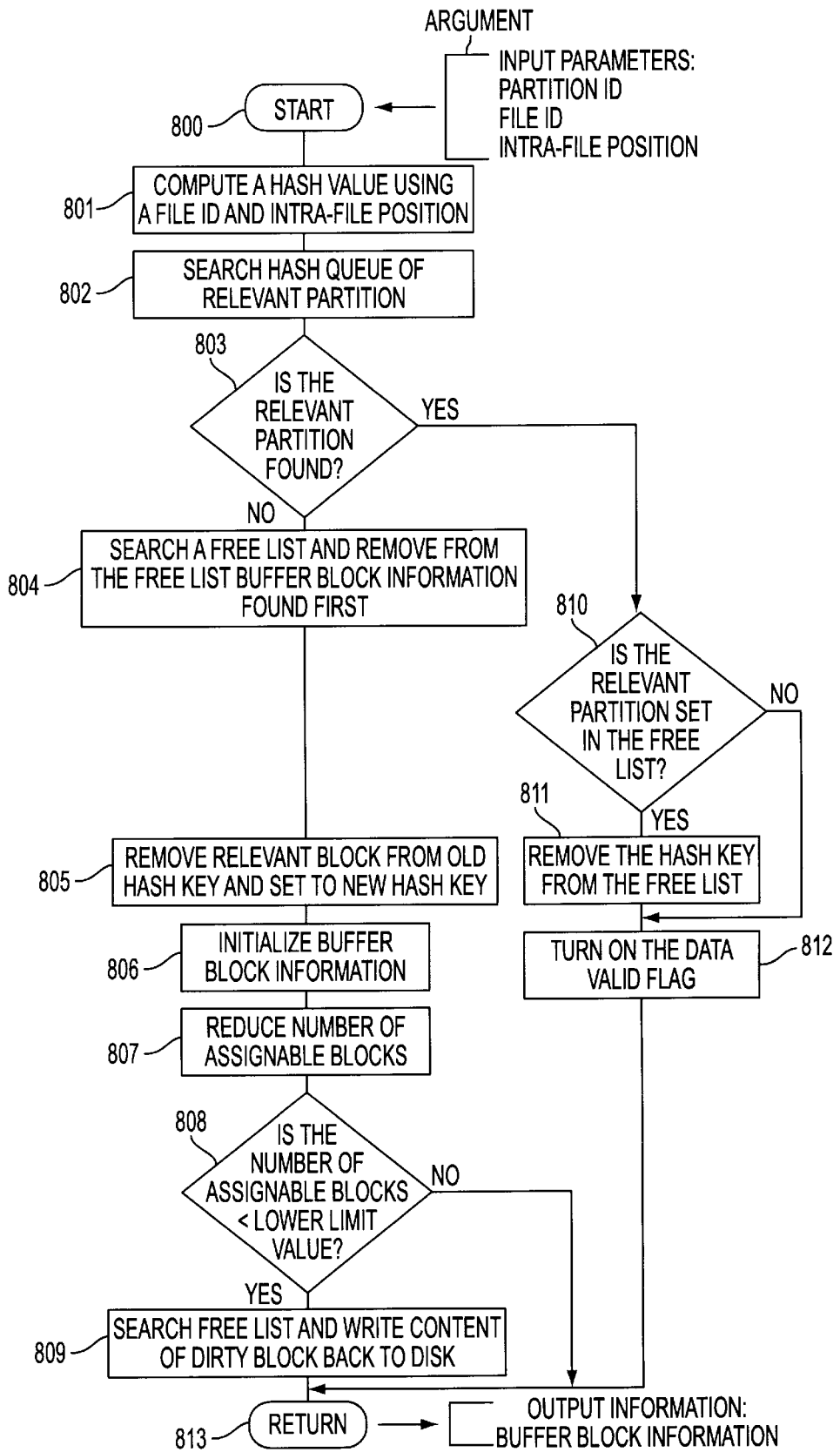
FIG. 8 is a flowchart of buffer block acquisition processing according to the present invention.

FIG. 8 is a flowchart for buffer block acquisition processing according to the present invention.

The buffer block acquisition processing unit 16 shown in FIG. 2 is called from the file management processing unit 31 during data input/output of each program 30A–30B. An input parameter of arguments includes the partition ID for designating a partition as the acquisition object of the block, the file ID of the data input/output object and the intra-file position information (step 800 in FIG. 8).

The buffer block acquisition processing unit 16 computes, in step 801, a hash value using the designated file ID and the intra-file position as the key. Next, step 802 obtains an entry of the hash table 41 in a relevant partition shown in FIGS. 4A–4C on the basis of the computed hash value, upon searching the hash queue.

In step 803, when the intra-file position and the relevant buffer block information 42 having the matched file ID are found as a result of a decision, processing skips to step 810. If the relevant buffer block information 42 is not found, processing proceeds to step 804.

If the relevant buffer block information 42 is not found, the free list 40 is searched in step 804 and the buffer block information 42 of a first assignable block is found and is taken out of the free list 40. In step 805, the buffer block information 42 of this block is taken out of the old hash queue and is then input to the new hash queue corresponding to the hash value computed using the file ID and intra-file position as the key. In step 806, initialization processes for the buffer block information 42 such as setting the file ID, setting the intra-file position and turning OFF the data valid flag are carried out. The number of assignable blocks is reduced in step 807.

In step 808, it is decided whether the number of assignable blocks becomes less than the lower limit value of the assignable blocks. When the number of assignable blocks is not less than the lower limit value of the assignable blocks, processing skips to step 813. When the number of assignable blocks is less than the lower limit value of the number of assignable blocks, the free list 40 is searched in step 809. Moreover, contents of the block for which the dirty flag is turned ON are returned to the disk apparatus 32 through the writing operation. Thus, the relevant block can be changed to the assignable condition when it is desired to increase the number of assignable blocks. Thereafter, processing skips to step 813.

In step 803, when the relevant buffer block information 42 is found, then step 810 determines whether or not the buffer block information 42 is set in the free list 40. When it is set in the free list 40, then step 811 removes the buffer block information 42 from the free list 40.

Step 812 turns ON the data valid flag in the relevant buffer block information 42. Processing then proceeds to step 813.

In step 813, the buffer block information 42 of the acquired block is returned as the output information to the file management processing unit 31 as the calling party.

Figure 9:
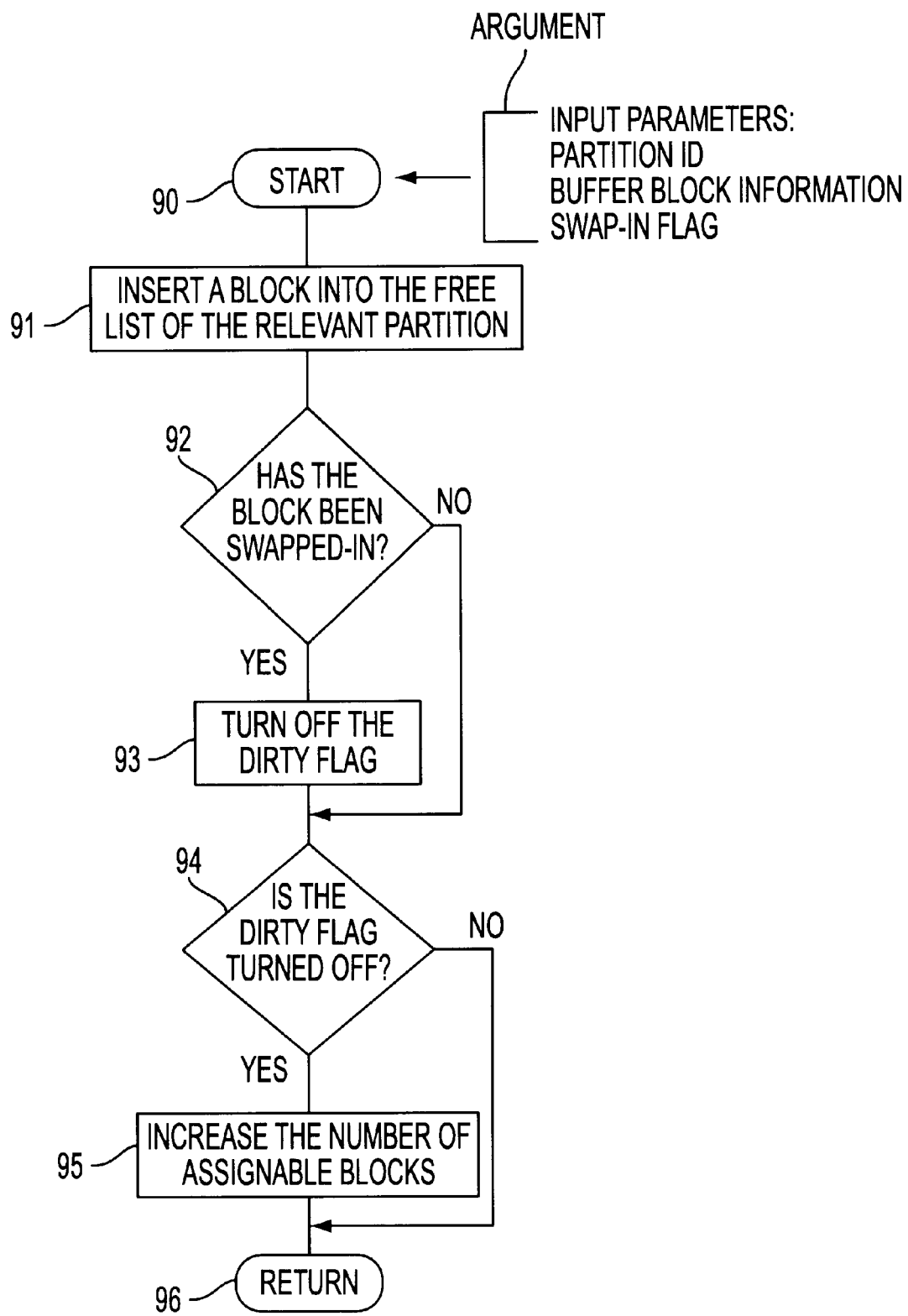
FIG. 9 is a flowchart of buffer block release processing according to the present invention.

FIG. 9 is a flowchart showing buffer block release processing according to the present invention.

The buffer block release processing unit 17 shown in FIG. 2 is called from the file management processing unit 31 for releasing the acquired buffer block. In step 90, an input parameter of arguments includes a partition ID for designating a partition in which the block to be released exists, the buffer block information and a swap-in flag. The swap-in flag is turned ON for releasing the buffer block for which the swap-in is carried out or is turned OFF for other cases.

The buffer block release processing unit 17 first sets the buffer block information 42 of the block to be released to the free list 40 of the relevant partition in step 91. Next, in step 92, it is determined whether the swap-in flag is ON or OFF. In step 93, when the swap-in flag is ON, that is, when the block is to be released under the swap-in mode, the dirty flag is turned OFF.

In step 94, it is determined whether the dirty flag is ON or OFF. When the dirty flag is OFF, the number of assignable blocks is increased. Thereafter, the buffer block information 42 is returned to the file management processing unit as the calling party in step 96.

Figures 10A, 10B:
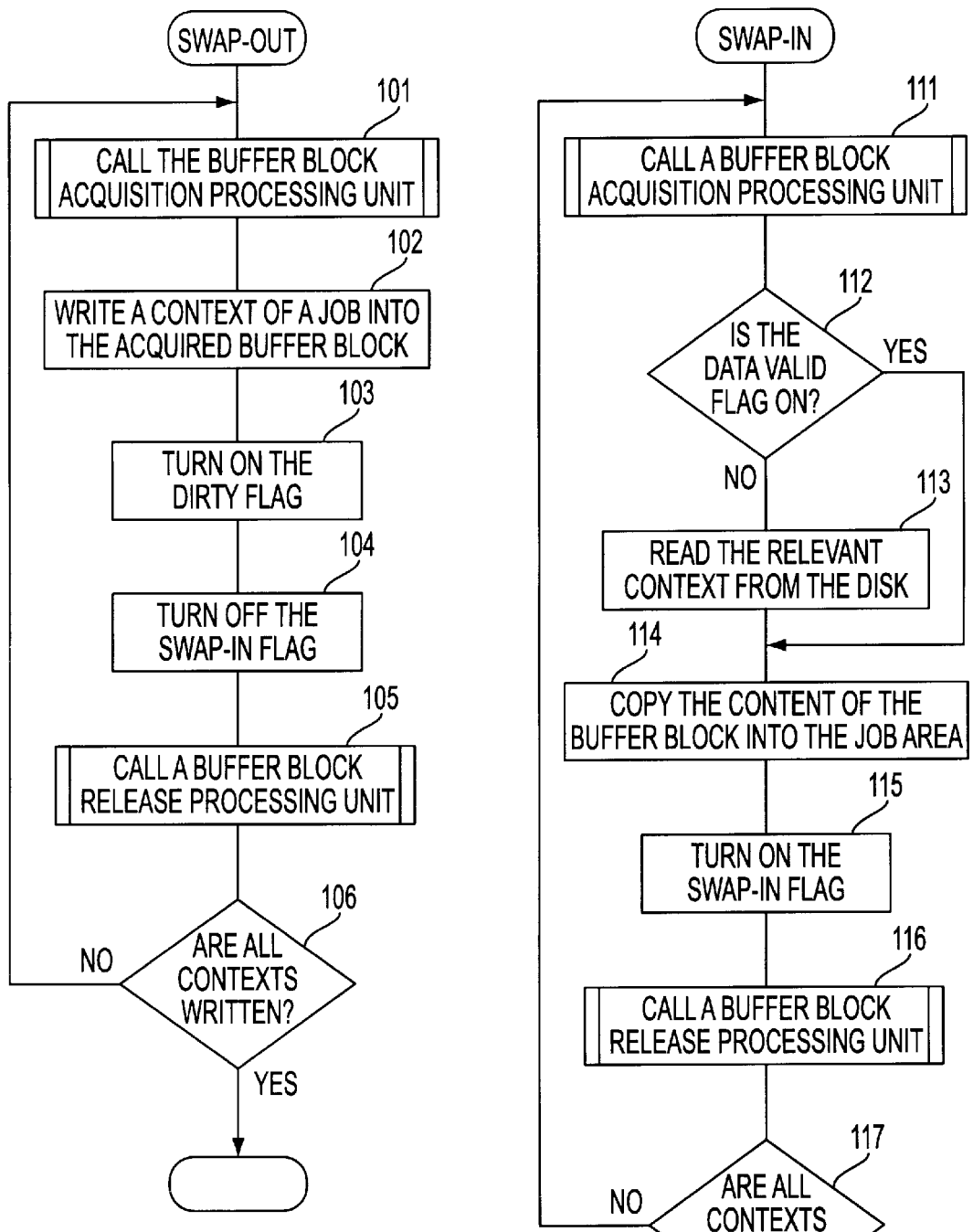
FIGS. 10A and 10B are flowcharts of swap processing according to the present invention.

FIGS. 10A and 10B are flowcharts explaining swap processing according to the present invention. Swap control is carried out for the job by the swap-out processing shown in FIG. 10A and the swap-in processing shown in FIG. 10B with the file management processing unit 31 shown in FIG. 2 and swap control processing unit (not shown).

During the swap-out mode, the buffer block acquisition processing unit 16 is called in step 101 by designating the partition ID of the buffer area 18S for system data, the file ID of the swap file and the intra-file position to acquire the block for the swap file. In step 102, the context 50 of the job to be swapped out is written into the acquired buffer block. The dirty flag in the buffer block information 42 of the relevant block is then turned ON in step 103.

Next, in step 104, the swap-in flag is turned OFF. The buffer block release processing unit 17 is called in step 105, using the partition ID, buffer block information and swap-in flag as the arguments. Step 106 determines whether the swap-out of all contexts 50 is completed when control is returned from the buffer block release processing unit 17. If any part is left unprocessed, the processing returns to step 101 to repeat similar processings for the next block. When the processings are all completed for all contexts 50, the swap-out processing is completed.

During the swap-in mode, the buffer block acquisition processing unit 16 is called in step 111 by designating the partition ID for the buffer region 18S for system data, the file ID of the swap file and the intra-file position of the swap-in object. Step 112 determines whether the data valid flag is ON or OFF when the buffer block is acquired. When the data valid flag is ON, processing proceeds to step 114.

When the data valid flag is OFF, the relevant context 50 is read into the acquired block from the swap file on the disk apparatus 32 in step 113.

In step 114, the content of the buffer block is copied to the job area for recovery of the context 50. Thereafter, the swap-in flag is turned ON in step 115 and the buffer block release processing unit 17 is called using the partition ID, buffer block information and the swap-in flag as the arguments. Step 117 determines whether the swap-in of all contexts 50 is complete when the control is returned from the buffer block release processing unit 17. If any part is left unprocessed, similar processings are repeated for the next block after returning to step 111. When processings are completed for all contexts 50, the swap-in processing is also completed.

As described above, according to the present invention, it is possible to execute buffer management for each application object fitted to a specific application of each input and output, resulting in an improvement in performance of the system as a whole. Particularly, in a parallel computer system including a plurality of processors, for example, having as many as several tens of units to several tens of thousands of units, the technique for effectively managing and using the limited buffer areas in each processor has been required. The present invention realizes high speed input/output processings utilizing buffers and also effective use of the buffer areas.

The foregoing is considered as illustrative only of the principles of the invention. Further, since numerous modifications and changes will readily occur to those skilled in the art, it is not desired to limit the invention to the exact construction and application shown and described, and accordingly, all suitable modifications and equivalents may be resorted to falling within the scope of the invention and the appended claims and their equivalents.

I claim:

1. A file system in a computer system, comprising:

a central processing unit;

a main storage area within said central processing unit;

a secondary storage device coupled to said main storage area;

a plurality of buffer areas, coupled to said secondary storage device and said main storage area, to perform data transfer by file input and output between said main storage area and said secondary storage device; and a buffer management processing unit, operatively connected to said buffer—areas, dividing said buffer areas into predetermined fixed areas of different block sizes for a plurality of applications including at least a first buffer area for system data and a second buffer area for user data, providing independent management of said buffer areas of different block sizes and controlling acquisition and release of each buffer area.

2. A file system according to claim 1, further comprising a block size designating unit, operatively connected to said buffer management processing unit, for designating a block size as a buffer management unit for each of the predetermined fixed areas, and wherein said buffer management processing unit manages said first and second buffer areas depending on the block size designated for each of said first and second buffer areas to control acquisition and release of said first and second buffer areas in accordance with the block size.

3. A file system according to claim 1, wherein said buffer management processing unit returns, when a number of assignable blocks existing within one of said buffer areas becomes less than a predetermined number, blocks having data stored therein to said secondary storage device, thereby increasing the number of assignable blocks.

4. A file system according to claim 1, further comprising a lower limit value designating unit, operatively connected to said buffer management processing unit, for designating a lower limit value of a number of assignable blocks existing within each of said buffer areas as a buffer management unit for said buffer areas, and wherein said buffer management processing unit returns, when the number of assignable blocks existing within one of said buffer areas becomes less than the lower limit value of the number of assignable blocks designated for each of said buffer areas, blocks having data stored therein to said secondary storage device until the number of assignable blocks is greater than the lower limit value.

5. A file system in a computer system including a central processing unit, a main storage device and a secondary storage device, said file system comprising:

a plurality of buffer areas, including blocks, to perform data transfer by file input and output between the main memory storage device and the secondary memory storage device;

a swap control unit, operatively connected to said buffer areas, to manage swapping between the main storage device and the secondary storage device by acquiring a first one of said blocks as a swap area, performing a swap-out by writing from the main memory to the first one of said blocks, setting a dirty display mode indicating that contents of said first one of said blocks is not yet written into the secondary storage device, returning the first one of said blocks to the main memory if valid when a swap-in of the first one of said blocks is requested and otherwise acquiring a second one of said blocks as a swap area and reading the contents of the first one of said blocks from the secondary memory into the second one of said blocks prior to performing the swap-in of the second one of said blocks, and releasing whichever of the first and second ones of said blocks was used for the swap-in by cancelling said dirty display mode after the swap-in has been completed; and a buffer management processing unit, operatively connected to said buffer areas, for managing said buffer areas and acquiring assignable blocks so that a number of the assignable blocks is greater than a lower limit value of said number of the assignable blocks when said number of the assignable blocks within said buffer areas becomes less than said lower limit value, by returning the contents of said first one of said blocks to which said dirty display mode is set to said secondary storage device through repeated writing thereof.

6. A file system in a computer system including a main storage device and a secondary storage device, comprising:

a plurality of buffer areas, including blocks, to perform data transfer by file input and output between the main storage device and the secondary storage device;

a buffer management processing unit, operatively connected to said buffer areas, for dividing said buffer areas into predetermined fixed areas including at least a first buffer area and a second buffer area, providing independent management of respective buffer areas and controlling acquisition and release of each buffer area;

a lower limit value designating unit, operatively connected to said buffer management processing unit, for designating a lower limit value of a number of assignable blocks within the respective buffer areas, said buffer management processing unit returning said blocks having data stored therein to said secondary storage device until the number of the assignable blocks is greater than the lower limit value when the number of the assignable blocks existing within said buffer areas becomes less than the lower limit value; and swap control means for managing swapping between the main storage device and the secondary storage device by acquiring one of said blocks as a swap area and setting a dirty display mode indicating the one of said blocks is not yet written into the secondary storage device when a swap-out occurs and releasing the one of said blocks by cancelling said dirty display mode after a swap-in occurs.

* * * * *